(12) United States Patent
Gheorghiu et al.

(10) Patent No.: US 11,937,195 B2
(45) Date of Patent: *Mar. 19, 2024

(54) CHANNEL AND SYNCHRONIZATION RASTER

(71) Applicant: QUALCOMM Incorporated, San Diego, CA (US)

(72) Inventors: Valentin Gheorghiu, Yokohama (JP); Masato Kitazoe, Tokyo (JP); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/408,099

(22) Filed: Aug. 20, 2021

(65) Prior Publication Data

US 2021/0385767 A1 Dec. 9, 2021

Related U.S. Application Data

(63) Continuation of application No. 16/166,960, filed on Oct. 22, 2018, now Pat. No. 11,102,736.

(60) Provisional application No. 62/576,461, filed on Oct. 24, 2017.

(51) Int. Cl.
*H04L 12/28* (2006.01)
*H04L 5/00* (2006.01)
*H04W 28/20* (2009.01)
*H04W 56/00* (2009.01)
*H04J 1/16* (2006.01)

(52) U.S. Cl.
CPC ......... *H04W 56/001* (2013.01); *H04L 5/0098* (2013.01); *H04W 28/20* (2013.01); *H04W 56/00* (2013.01); *H04L 5/001* (2013.01); *H04L 5/003* (2013.01); *H04L 5/0048* (2013.01); *H04L 5/0094* (2013.01)

(58) Field of Classification Search
CPC . H04L 7/00; H04L 27/26025; H04L 27/2657; H04W 56/00; H04W 56/001; H04W 72/0453; H04J 11/0086
USPC ................................ 370/252, 329, 430, 503
See application file for complete search history.

(56) References Cited

U.S. PATENT DOCUMENTS

| | | | |
|---|---|---|---|
| 8,599,708 B2 | 12/2013 | Chen et al. | |
| 11,102,736 B2 | 8/2021 | Gheorghiu et al. | |
| 2011/0235743 A1 | 9/2011 | Lee et al. | |

(Continued)

FOREIGN PATENT DOCUMENTS

| CN | 111357337 B | 11/2021 |
|---|---|---|
| CO | 2019003461 A2 | 6/2019 |

(Continued)

OTHER PUBLICATIONS

Taiwan Search Report—TW107137337—TIPO—dated May 20, 2022.

(Continued)

*Primary Examiner* — John Pezzlo
(74) *Attorney, Agent, or Firm* — QUALCOMM IP DEPT.; James Hunt Yancey, Jr.

(57) ABSTRACT

Aspects of the present disclosure include methods, apparatuses, and computer readable media for inserting an offset between a channel resource element of a channel resource block and a synchronization resource element of a synchronization signal block, transmitting a bandwidth value of the offset to a user equipment.

13 Claims, 14 Drawing Sheets

(56) References Cited

U.S. PATENT DOCUMENTS

| | | | | |
|---|---|---|---|---|
| 2014/0105165 | A1* | 4/2014 | Dinan | H04W 72/54 |
| | | | | 370/329 |
| 2016/0128028 | A1 | 5/2016 | Mallik et al. | |
| 2018/0034599 | A1 | 2/2018 | Zhou et al. | |
| 2018/0338304 | A1 | 11/2018 | Gheorghiu et al. | |
| 2019/0098590 | A1* | 3/2019 | Nam | H04W 72/0446 |
| 2019/0110287 | A1 | 4/2019 | Lee et al. | |
| 2019/0166611 | A1* | 5/2019 | Noh | H04W 72/1273 |
| 2019/0357159 | A1* | 11/2019 | Pan | H04W 56/001 |
| 2020/0067755 | A1* | 2/2020 | Pan | H04L 27/2656 |
| 2020/0084739 | A1 | 3/2020 | Si et al. | |
| 2020/0099493 | A1* | 3/2020 | Ko | H04W 56/00 |
| 2020/0100301 | A1 | 3/2020 | Kusashima et al. | |
| 2020/0236638 | A1 | 7/2020 | Song et al. | |
| 2020/0314845 | A1 | 10/2020 | Miao et al. | |

FOREIGN PATENT DOCUMENTS

| | | |
|---|---|---|
| WO | 2011088403 | 7/2011 |
| WO | 2017119429 A1 | 7/2017 |
| WO | 2017123279 A1 | 7/2017 |

OTHER PUBLICATIONS

Hewlett Packard Enterprise, et al., "TP to TR 36.789 v0.0.4: Test Metrics for Multi-Node Testing (Section 6.1.3)", 3GPP TSG-RAN WG4 Meeting #82bis, R4-1703356, Spokane, WA, USA Apr. 3-7, 2017, 2 Pages.

Qualcomm Incorporated: "Channel Raster and Synchronization Signal Raster Considerations", 3GPP Draft, R4-1704567, 3GPP TSG-RAN WG4 RAN4 #83, 3rd Generation Partnership Project (3GPP), Mobile Competence Centre, 650, Route Des Lucioles, F-06921, Sophia-Antipolis Cedex, France, vol. RAN WG4, No. Hangzhou, China, May 19, 2017-May 25, 2017 May 14, 2017, XP051276817, Retrieved from the Internet: URL:http://www.3gpp.org/ftp/Meetings_3GPP_SYNC/RAN4/Docs/ [retrieved on May 14, 2017], pp. 1-3.

Qualcomm Incorporated: "Channel Raster and Synchronization Signal Raster for NR", 3GPP TSG-RAN WG4 RAN4 NR#2, R4-1706544, Qingdao, China, Jun. 27-29, 2017, pp. 1-5.

Qualcomm Incorporated: "Channel Raster for NR", 3GPP TSG-RAN WG4 NR Ad-hoc#3, R4-1709312, Nagoya, Japan, Sep. 21-25, 2017, pp. 1-3.

Qualcomm Incorporated: "SCS Based Raster for low bands", 3GPP TSG-RAN WG4 NR Ad-hoc#3, R4-1709723, Nagoya, Japan, Sep. 21-25, 2017, pp. 1-2.

Qualcomm Incorporated: "Synchronization Raster for NR", 3GPP TSG-RAN WG4 NR Ad-hoc#3, R4-1709313, Nagoya, Japan, Sep. 21-25, 2017, pp. 1-5.

Taiwan Search Report—TW107137337—TIPO—dated Nov. 4, 2021.

Qualcomm Incorporated: "Synchronization Raster for NR", 3GPP Draft, R4-1710175, 3GPP TSG-RAN WG4 RAN#84, 3rd Generation Partnership Project (3GPP), Mobile Competence Centre, 650, Route Des Lucioles, F-06921 Sophia-Antipolis Cedex, France, vol. RAN WG4, No. Dubrovnik, Croatia, Oct. 9, 2017-Oct. 13, 2017, Oct. 8, 2017 (Oct. 8, 2017), XP051345065, pp. 1-5, Retrieved from the Internet: URL: http://www.3gpp.org/ftp/Meetings_3GPP_SYNC/RAN4/Docs/ [retrieved on Oct. 8, 2017] the whole document.

AT&T:"NR Sync Channel Raster for LTE-NR Coexistence", 3GPP Draft, 3GPP TSG RAN WG4 Meeting 84bis, R4-1711138 NR Sync Raster, 3rd Generation Partnership Project (3GPP), Mobile CompetenceCentre, 650, Route Des Lucioles ; F-06921 Sophia-Antipolis Cedex, France, vol. RAN WG4, No. Prague, CZ; Oct. 9, Oct. 9, 2017-Oct. 13, 2017, Oct. 8, 2017 (Oct. 8, 2017), XP051345900, 2 Pages, Retrieved from the Internet: URL: http://www.3gpp.org/ftp/Meetings_3GPP_SYNC/RAN4/Docs/[retrieved on Oct. 8, 2017].

International Search Report and Written Opinion—PCT/US2018/057141—ISA/EPO—dated Apr. 4, 2019.

NOKIA: "Remaining Details on NR-PBCH", 3GPP Draft, 3GPP TSG-RAN WG1 NR AH#3, R1-1716524, 3rd Generation Partnership Project (3GPP), Mobile Competence Centre, 650, Route Des Lucioles ; F-06921 Sophia-Antipolis Cedex, France, vol. RAN WG1, No. Nagoya, Japan; Sep. 18, 2017-Sep. 21, 2017, Sep. 17, 2017 (Sep. 17, 2017), XP051339977, 13 Pages, Retrieved from the Internet: URL: http://www.3gpp.org/ftp/Meetings_3GPP_SYNC/RAN1/Docs/ [retrieved on Sep. 17, 2017], Paragraph [2.1.3].

Partial International Search Report—PCT/US2018/057141—ISA/EPO—dated Feb. 13, 2019.

Qualcomm Incorporated: "Channel Raster and Synchronization Signal Raster for NR", 3GPP Draft, 3GPP TSG-RAN WG4 RAN#84, R4-1707335, 3rd Generation Partnership Project (3GPP), Mobile Competence Centre, 650, Route Des Lucioles ; F-06921 Sophia-Antipolis Cedex, France, vol. RAN WG4, No. Berlin, Germany; Aug. 21, 2017-Aug. 25, 2017, Aug. 20, 2017 (Aug. 20, 2017), XP051320565, pp. 1-5, Retrieved from the Internet: URL: http://www.3gpp.org/ftp/Meetings_3GPP_SYNC/RAN4/Docs/ [retrieved on Aug. 20, 2017], Paragraphs [0002].

Qualcomm Incorporated et al., "WF on Channel Raster for NR", 3GPP TSG-RAN WG4 RAN4 #84, Berlin, Germany, 2017, R4-1708850, 4 Pages.

RAN WG4: "LS on Channel Raster and Synchronization Channel Raster", 3GPP TSG RAN WG1 Meeting AH_NR#3, Nagoya, Japan, Sep. 18-21, 2017, R1-1715372, 3GPP TSG-RAN WG4 Meeting #84, Berlin, Germany, Aug. 21-25, 2017, R4-1709175, 2 Pages.

NTT Docomo, Inc: "Views on Floating Sync Concept", 3GPP TSG-RAN WG4 Meeting #84bis, R4-1711062, Dubrovnik, Republika Hrvatska, Oct. 9-13, 2017, 5 Pages.

* cited by examiner

400

CHANNEL AND SYNCHRONIZATION RASTER

CROSS REFERENCE TO RELATED APPLICATIONS

This application is a continuation of U.S. application Ser. No. 16/166,960, entitled "Channel and Synchronization Raster" and filed on Oct. 22, 2018, which claims the benefit of the U.S. Provisional Application Ser. No. 62/576,461, entitled "Channel and Synchronization Raster" and filed on Oct. 24, 2017, the content of which is expressly incorporated in its entirety.

BACKGROUND

Aspects of the present disclosure relate generally to wireless communication networks, and more particularly, to apparatus and methods for aligning resource elements (RE) and resource blocks (RB) of synchronization signals.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

In wireless communication, certain legacy networks (e.g., fourth generation such as 4G LTE) may include re-farming bands (e.g., below 2.6 gigahertz (GHz)) that utilize 100 kilohertz (kHz) raster. Other bands (e.g., above 2.6 GHz) may utilize subcarrier spacing (SCS) based raster. Without a uniform alignment scheme, a user equipment (UE) may not be able to quickly locate synchronization blocks, for example, for various network access technologies. Therefore, improvements in synchronization signal blocks alignment may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for inserting an offset between a channel resource element of a channel resource block and a synchronization resource element of a synchronization signal block and transmitting a bandwidth value of the offset to a user equipment.

Other aspects of the present disclosure include apparatuses including a memory, a transceiver, and one or more processors operatively coupled with the memory and the transceiver, the one or more processors configured to perform the steps of inserting an offset between a channel resource element of a channel resource block and a synchronization resource element of a synchronization signal block and transmitting a bandwidth value of the offset to a user equipment.

An aspect of the present disclosure includes an apparatus including means for inserting an offset between a channel resource element of a channel resource block and a synchronization resource element of a synchronization signal block and means for transmitting a bandwidth value of the offset to a user equipment.

Some aspects of the present disclosure include a computer readable medium storing code executable by one or more processors including code for inserting an offset between a channel resource element of a channel resource block and a synchronization resource element of a synchronization signal block and code for transmitting a bandwidth value of the offset to a user equipment.

Aspects of the present disclosure include methods, apparatuses, means, and computer readable media for allocating a first channel having a first number of resource blocks, a synchronization channel having a second number of resource blocks, and a second channel, determining an offset having a third number of resource blocks, wherein the second channel is a sum of the first number minus the second number plus the third number of resource blocks away from the first channel, and transmitting a value of the third number of resource blocks to a user equipment.

Some aspects of the present disclosure include methods for receiving an offset value from a base station, wherein the offset value indicates an offset between a channel resource element of a channel resource block and a synchronization resource element of a synchronization signal block, locating the synchronization signal block based on a location of the channel resource block and the offset value, and receiving data carried by the synchronization signal block.

Other aspects of the present disclosure include apparatuses including a memory, a transceiver, and one or more processors operatively coupled with the memory and the transceiver, the one or more processors configured to perform actions including receiving, from the base station, a channel resource block and a synchronization signal block, receiving an offset value from the base station, wherein the offset value indicates an offset between a channel resource element of a channel resource block and a synchronization resource element of a synchronization signal block, locating the synchronization signal block based on a location of the channel resource block and the offset value, and receiving data carried by the synchronization signal block.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
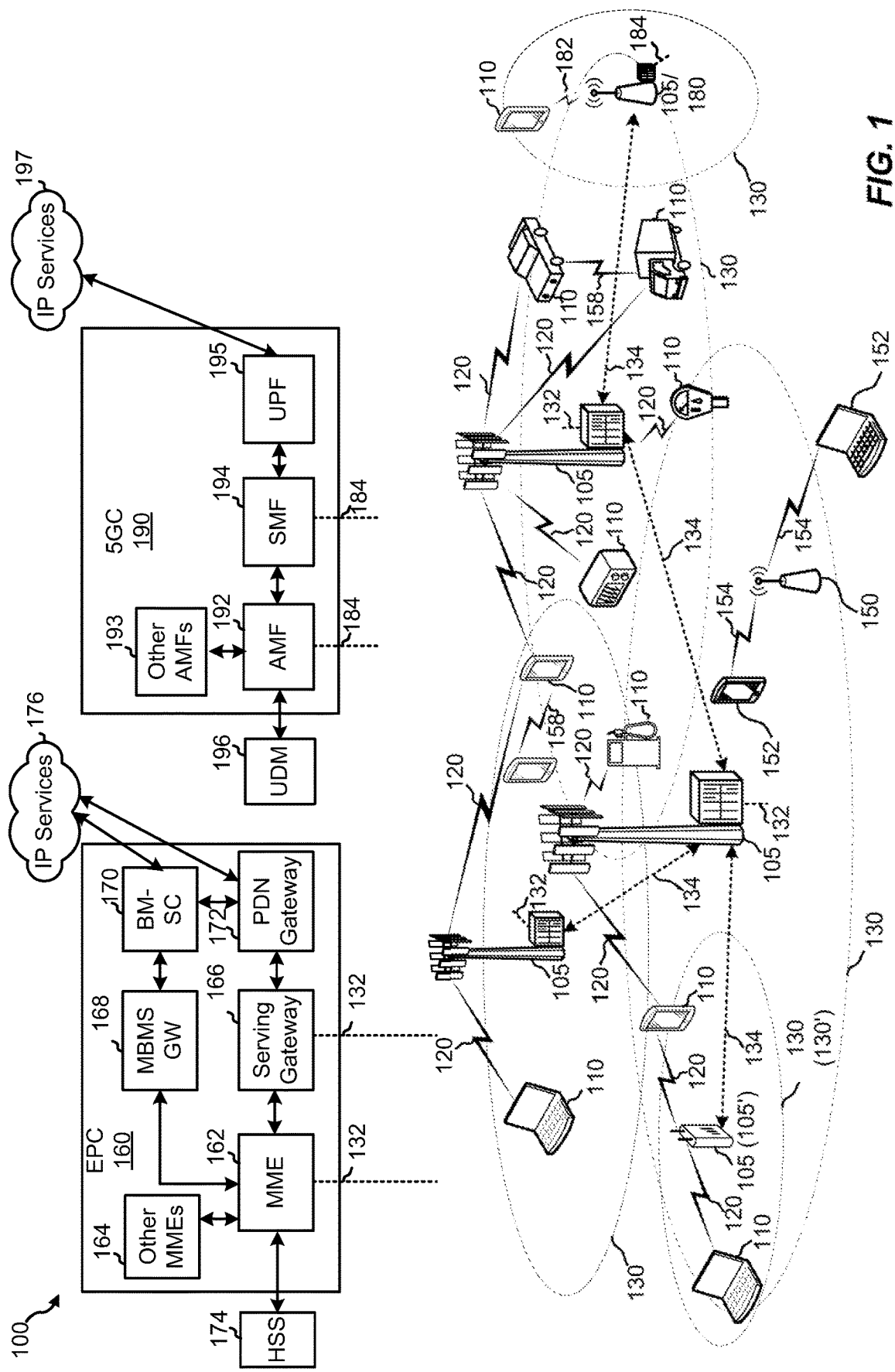
FIG. 1 is a schematic diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A user equipment may be connected to networks utilizing various technologies and standards, and may not be able to quickly locate necessary information within the allocated resources. Further, various standards may include resources of different time and/or frequency spans. An aspect of the present disclosure includes the base station transmitting synchronization blocks to the UE and placing the synchronization blocks at a predetermined offset with respect to certain data blocks, such as the channel resource blocks.

FIG. 1 is a diagram illustrating an example of a wireless communications system and an access network 100. The wireless communications system (also referred to as a wireless wide area network (WWAN)) includes base stations 105, UEs 110, an Evolved Packet Core (EPC) 160, and a 5G Core (5GC) 190. The base stations 105 may include macro cells (high power cellular base station) and/or small cells (low power cellular base station). The macro cells include base stations. The small cells include femtocells, picocells, and microcells.

The base stations 105 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 105 configured for 5G NR (collectively referred to as Next Generation RAN (NG-RAN)) may interface with 5GC 190 through backhaul links 184. In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 105 may communicate directly or indirectly (e.g., through the EPC 160 or 5GC 190) with each other over backhaul links 134 (e.g., X2 interface). The backhaul links 134 may be wired or wireless.

The base stations 105 may wirelessly communicate with the UEs 110. Each of the base stations 105 may provide communication coverage for a respective geographic coverage area 130. There may be overlapping geographic coverage areas 130. For example, the small cell 105' may have a coverage area 130' that overlaps the coverage area 130 of one or more macro base stations 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base stations 105/UEs 110 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some examples, LTE bands below 2.6 GHz may include 100 kHz raster. Bands above 2.6 GHz (including n41) may use SCS based channel raster. Channel raster for SCS bands may be universal raster. In some communication networks, for sub6 bands (i.e. bands below 6 GHz) the channel raster may be integer multiples of 15 kHz, and for millimeter waves, the raster may be integer multiples of 60 kHz. The numbering of raster entries may be implemented as band dependent or universal. These communication networks may deploy channel raster in the center of a communication band, for example, with the first resource element RE #0 of RB number floor($N_{RB}$/2) for even number of RBs, and RE #6 of RB number floor($N_{RB}$/2) for odd number of RBs. In other implementations, the UE may be able to derive the RB alignment among different numerologies (RE #0 or which RB of lower numerology aligns with RE #0 of which RB of higher numerology).

For each band there may be a "default" synchronization numerology and some bands might have multiple defaults. Synchronization raster may define fixed positions in each band where the synchronization signal (SS) block may be deployed. One option may be using the same mapping as channel raster, for example, where the absolute frequency at RE #0 of RB #10. The synchronization entries may be numbered so that there is a unique identifier for each of them. For bands with 100 kHz channel raster, synchronization raster position will not be on the 100 kHz raster. Three offsets of 100 kHz may be utilized to cover possible subcarrier offsets. For example, if one position of the synchronization signal block is at 845.45 MHz, entries at 845.55 MHz and 845.65 MHz may also be used. Other numbers of offsets may also be used. For bands with subcarrier based raster, synchronization raster position may be on the channel raster position (e.g., any subcarrier position is a valid channel raster entry). Synchronization raster positions may be used as a reference for the position of any subcarrier within a channel in any band. For 100 kHz raster, the 3 offsets may cover possible subcarrier position offsets. For SCS based raster, the subcarriers may occur at N×15 kHz compared to the synchronization raster, where N is an integer greater than 0.

The signaling of raster position may be useful in configuring measurement objects (both standalone and non-standalone), and provide network signals on where to find the SS block. Further, the signaling of raster position may be useful for configuring a communication channel, both standalone and non-standalone, and provide network signals to locate the center of the communication channel. Together with a number of RBs and/or channel bandwidth (BW), the raster position may provide information about the communication channel. By appropriately utilizing the synchronization channel, the UE may be able to locate subcarriers within the communication channel.

In some instances, the UE configured channel position may be agnostic to the base station channel. The UE should be able to operate properly without knowing the total bandwidth of the gNB channel. Instead the UE should be able to operate properly by knowing where the configured channel is placed for de-scrambling (or generating other sequences used for reference signals, etc.). In some examples, the UE and the base station may have different bandwidths. There may be multiple options for signaling the channel raster position. The first option is to signal relative to a SS block raster position. For sub6 bands the signaling points to an exact subcarrier position (e.g. SS block raster #+N×15 kHz). The raster position and the number of RBs may provide the UE the location for SS block for measurement or a communication channel. This configuration works even for 100 kHz raster since synchronization raster has to cover all possible subcarrier position offsets. For millimeter wave, the signaling may be at SS block raster #+N*60 kHz. Alternatively, the signaling for the SS block may occur relative to the channel raster position. A second option is to use New Radio Absolute Radio Frequency No. (NRARFCN). Here, the signaling may be at NRARFCN+N*15 kHz. The signaling may point to an exact subcarrier position but may increase the number of bits for NRARFCN, especially if using a universal raster starting from DC.

Figure 2:
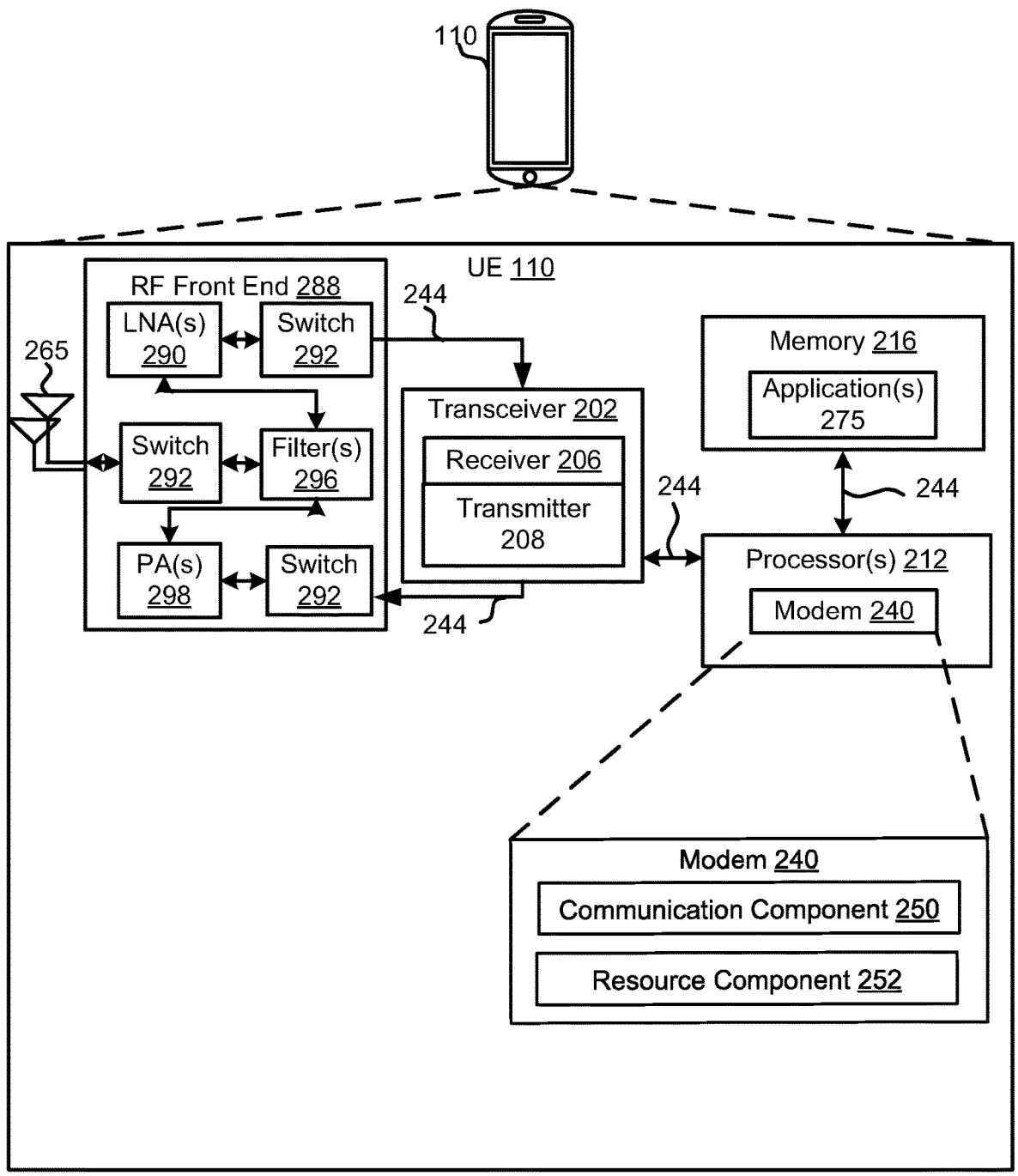
FIG. 2 is a schematic diagram of an example of a user equipment.
Figure 3:
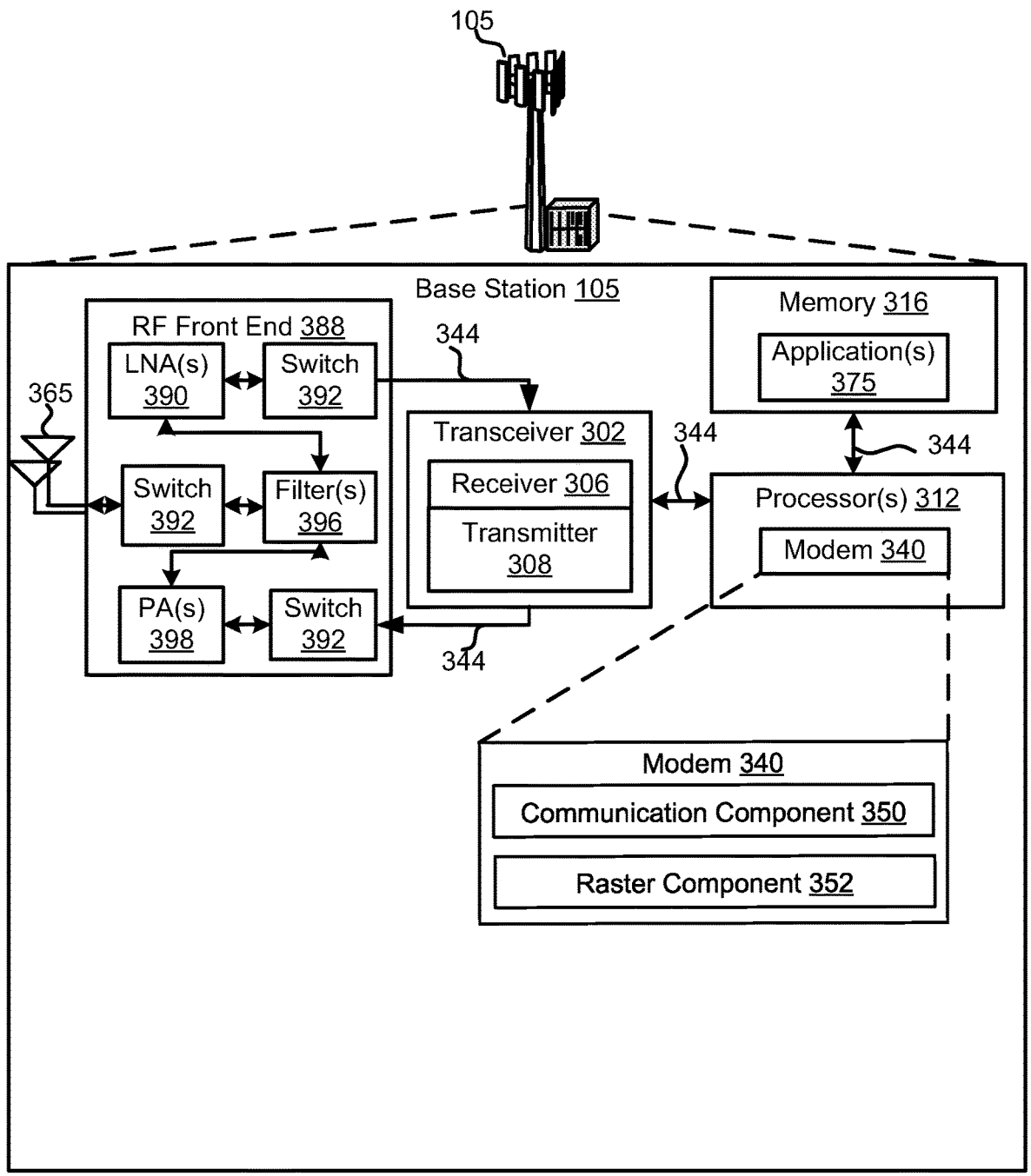
FIG. 3 is a schematic diagram of an example of a base station.

Referring to FIGS. 2 and 3, one example of an implementation of the UE 110 may include a modem 240 having a communication component 250 and a resource component 252. The communication component 250 may be configured to communicate with the other UEs 110 and/or base stations 105, such as sending/receiving messages to the other UEs 110 and/or base stations 105. The resource component 252 may locate resources based on an address value (e.g., an offset value, an absolute value) and obtain data in the resources at the address value.

The wireless network 100 may include at least one base station 105 including a modem 340 with a communication component 350 and a raster component 352. The communication component 350 may be configured to communicate with one or more UEs 110 and/or other base stations 105, such as sending/receiving messages to the UEs 110 and/or other base stations 105. The raster component 352 may insert subcarrier offset to align the communication channel RBs and synchronization signal blocks. Additionally, the raster component 352 may use synchronization signal blocks as references to signal the UEs 110.

The modem 340 of a base station 105 may be configured to communicate with other base stations 105 and UEs 110 via a cellular network, a Wi-Fi network, or other wireless and wired networks. The modem 240 of a UE 110 may be configured to communicate with the base stations 105 via a cellular network, a Wi-Fi network, or other wireless and wired networks. The modems 240, 340 may receive and transmit data packets.

In some implementations, the UE may include a variety of components, some of which have already been described above, but including components such as one or more processors 212 and memory 216 and transceiver 202 in communication via one or more buses 244, which may operate in conjunction with the modem 240 and the communication component 250 to enable one or more of the functions described herein related to communicating with the base station 105. Further, the one or more processors 212, modem 240, memory 216, transceiver 202, RF front end 288 and one or more antennas 265, may be configured to support voice and/or data calls (simultaneously or non-simultaneously) in one or more radio access technologies.

In an aspect, the one or more processors 212 can include the modem 240 that uses one or more modem processors. The various functions related to the communication component 250 may be included in the modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. Additionally, the modem 240 may configure the UE 110. In other aspects, some of the features of the one or more processors 212 and/or the modem 240 associated with the communication component 250 may be performed by transceiver 202.

Also, memory 216 may be configured to store data used herein and/or local versions of applications 275 or the communication component 250 and/or one or more subcomponents of the communication component 250 being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 250 and/or one or more of the subcomponents, and/or data associated therewith, when UE 110 is operating at least one processor 212 to execute the communication component 250 and/or one or more of their subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one base station 105 or wireless transmissions transmitted by UE 110. RF front end 288 may be coupled with one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be coupled with a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 can communicate with, for example, one or more base stations 105 or one or more cells associated with one or more base stations 105. In an aspect, for example, the modem 240 can configure transceiver 202 to operate at a specified frequency and power level based on the UE configuration of the UE 110 and the communication protocol used by the modem 240.

In an aspect, the modem 240 can be a multiband-multimode modem, which can process digital data and communicate with transceiver 202 such that the digital data is sent and received using transceiver 202. In an aspect, the modem 240 can be multiband and be configured to support multiple frequency bands for a specific communications protocol. In an aspect, the modem 240 can be multimode and be configured to support multiple operating networks and communications protocols. In an aspect, the modem 240 can control one or more components of UE 110 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network.

Referring to FIG. 3, one example of an implementation of may include a variety of components, some of which have already been described above, but including components such as one or more processors 312 and memory 316 and transceiver 302 in communication via one or more buses 344, which may operate in conjunction with the modem 340, the communication component 350, and the raster component 352 to enable one or more of the functions described herein related to communicating with the UE 110. Further, the one or more processors 312, modem 340, memory 316, transceiver 302, RF front end 388 and one or more antennas 365, may be configured to support voice and/or data calls (simultaneously or non-simultaneously) in one or more radio access technologies.

In an aspect, the one or more processors 312 can include the modem 340 that uses one or more modem processors. The various functions related to the communication component 350 may be included in the modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. Additionally, the modem 340 may configure the base station 105 and processors 312. In other aspects, some of the features of the one or more processors 312 and/or the modem 340 associated with the communication component 350 may be performed by transceiver 302.

Also, memory 316 may be configured to store data used herein and/or local versions of applications 375 or the communication component 350 and/or one or more subcomponents of the communication component 350 being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 350, the raster component 352, and/or one or more of the subcomponents, and/or data associated therewith, when the base station 105 is operating at least one processor 312 to execute the communication component 350 and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the base station 105 may include RF front end 388, which may operate in communication with one or more antennas 365 and transceiver 302 for receiving and transmitting radio transmissions, for example, wireless communications transmitted by other base stations 105 or wireless transmissions transmitted by UE 110. RF front end 388 may be coupled with one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be coupled with a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that base station 105 can communicate with, for example, the UE 110 or one or more cells associated with one or more base stations 105. In an aspect, for example, the modem 340 can configure transceiver 302 to operate at a specified frequency and power level based on the base station configuration of the base station 105 and the communication protocol used by the modem 340.

In an aspect, the modem 340 can be a multiband-multimode modem, which can process digital data and communicate with transceiver 302 such that the digital data is sent and received using transceiver 302. In an aspect, the modem 340 can be multiband and be configured to support multiple frequency bands for a specific communications protocol. In an aspect, the modem 340 can be multimode and be configured to support multiple operating networks and communications protocols. In an aspect, the modem 340 can control one or more components of the base station 105 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on base station configuration associated with the base station 105.

Figure 4:
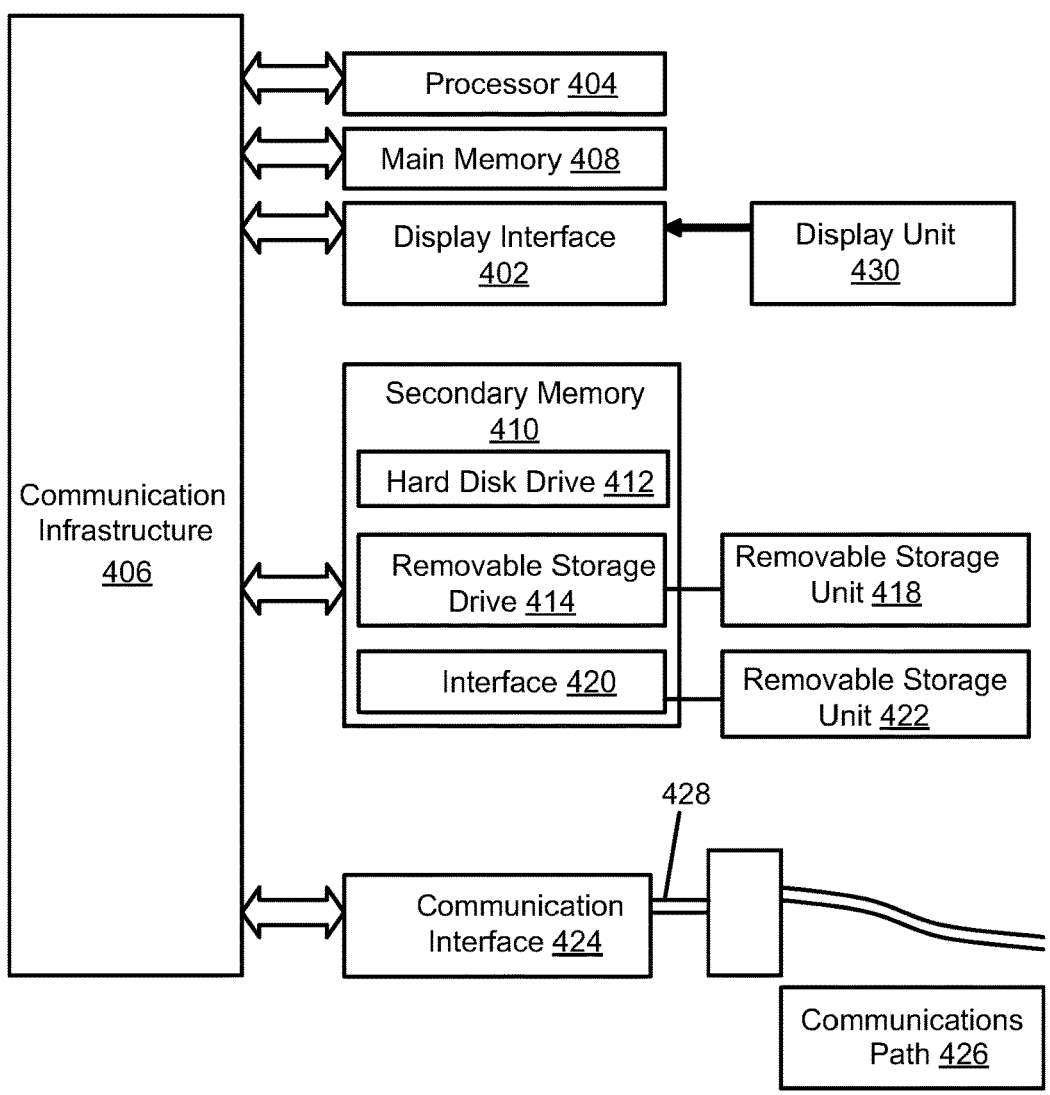
FIG. 4 is a schematic diagram of an example of a computer system for implementing a core network.

Referring now to FIG. 4, the core network 115 may be implemented as one or more core network devices, such as an example of a computer system 400. The computer system 400 may be a hardware system, a virtual system, a cloud-based system, or a combination thereof. The computer system 400 includes one or more processors, such as the processor 404. The processor 404 is communicatively coupled with a communication infrastructure 406 (e.g., a communications bus, cross-over bar, or network).

The computer system 400 may include a display interface 402 that forwards graphics, text, and other data from the communication infrastructure 406 (or from a frame buffer not shown) for display on a display unit 430. Computer system 400 also includes a main memory 408, preferably random access memory (RAM), and may also include a secondary memory 410. The secondary memory 410 may include, for example, a hard disk drive 412, and/or a removable storage drive 414, representing a floppy disk drive, magnetic tape drive, optical disk drive, universal serial bus (USB) flash drive, etc. The removable storage drive 414 reads from and/or writes to a first removable storage unit 418 in a well-known manner. The first removable storage unit 418 represents a floppy disk, magnetic tape, optical disk, USB flash drive etc., which is read by and written to removable storage drive 414. As will be appreciated, the first removable storage unit 418 includes a computer usable storage medium having stored therein computer software and/or data.

Alternative aspects of the present disclosure may include secondary memory 410 and may include other similar devices for allowing computer programs or other instructions to be loaded into computer system 400. Such devices may include, for example, a second removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units (not shown) and interfaces 420, which allow software and data to be transferred from the second removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using one or more of a wire or cable, fiber optics, telephone line, cellular link, RF link and/or other communications channels. In this document, the terms "computer program medium" and "computer usable medium" are used to refer generally to media such as the first removable storage drive 418, a hard disk installed in hard disk drive 412, and signals 428. These computer program products provide software to the computer system 400. Aspects of the present disclosure are directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features in accordance with aspects of the present disclosure, as discussed herein. In particular, the computer programs, when executed, enable the processor 404 to perform the features in accordance with aspects of the present disclosure. Accordingly, such computer programs represent controllers of the computer system 400.

In an aspect of the present disclosure where the method is implemented using software, the software may be stored in a computer program product and loaded into computer system 400 using removable storage drive 414, hard drive 412, or communications interface 420. The control logic (software), when executed by the processor 404, causes the processor 404 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 5:
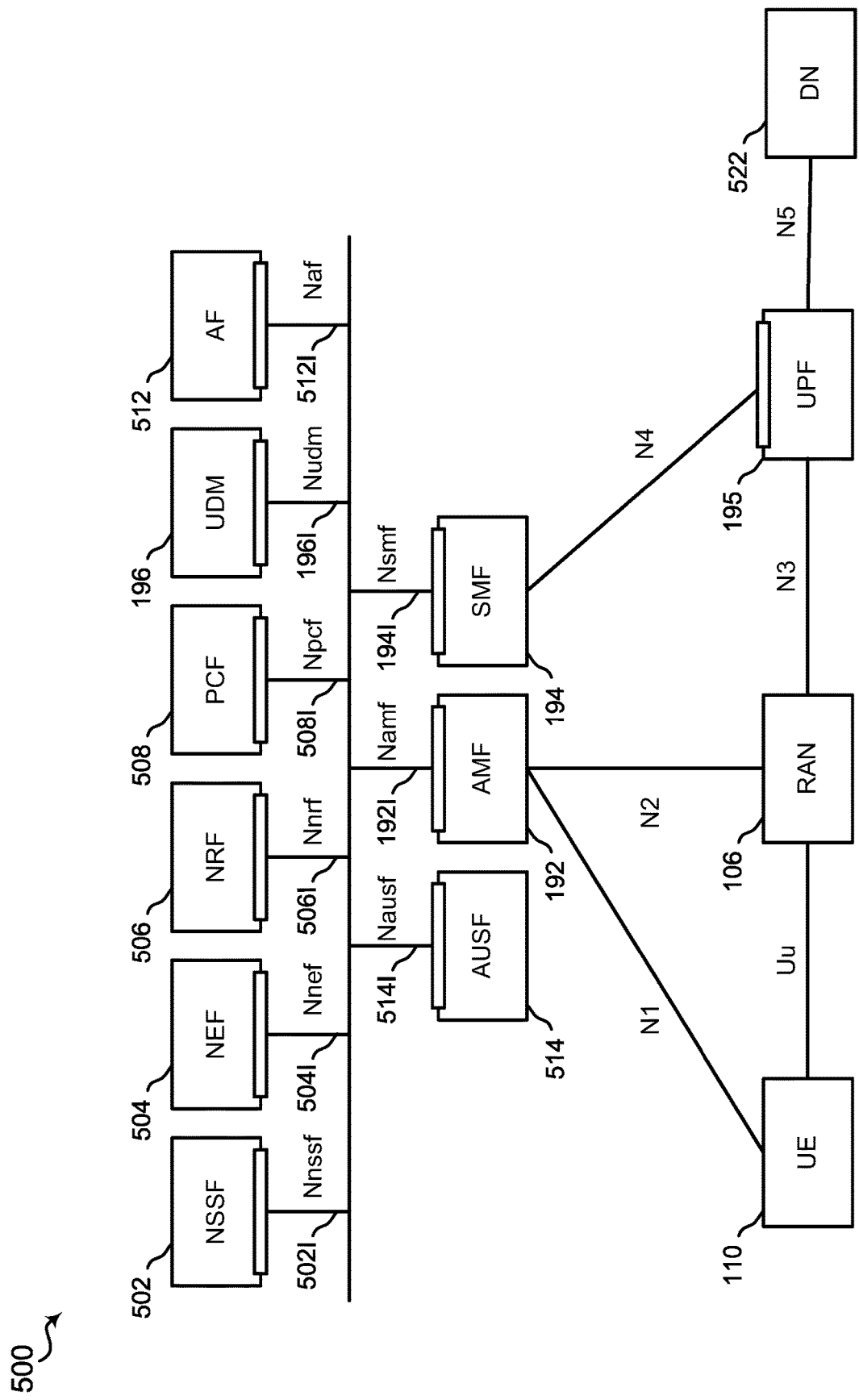
FIG. 5 is a functional diagram of an example of the service-based architecture (SBA)

Turning now to FIG. 5, a service based architecture (SBA) 500 of the wireless communication network 100 may include a number of interconnected network functions (NFs). The SBA 500 may include a network slice selection function (NSSF) 502 that may support the selection of the network slice instances to serve the one or more UEs 110, and determines the allowed network slice selection assistance information and the access and mobility management function (AMF) set to be used to serve the one or more UEs 110. The NSSF 502 may communicate with other functions within the SBA 500 via a Nnssf 502I interface. The SBA 500 may include a network exposure function (NEF) 504 that may support exposure of capabilities and events, secure provision of information from external application to various wireless communication networks, and translation of internal and external information. The NEF 504 may communicate with other functions within the SBA 500 via a Nnef 504I interface.

Still referring to FIG. 5, the SBA 500 may include a network function repository function (NRF) 506 that may support service discovery functions and may maintain NF profiles and available NF instances. The NRF 506 may communicate with other functions within the SBA 500 via a Nnrf 506I interface. The SBA 500 may include a policy control function (PCF) 508 that may support unified policy framework, provide policy rules to control plane (CP) functions, access subscription information for policy decisions in unified data repository (UDP). The PCF 508 may communicate with other functions within the SBA 500 via a Npcf 508I interface.

Still referring to FIG. 5, the SBA 500 may include the UDM 196 that may support the generations of authentication and key agreement (AKA) credentials, user identification handling, access authorization, and subscription management. The UDM 196 may communicate with other functions within the SBA 500 via a Nudm 196I interface. The SBA 500 may include an application function (AF) 512 that may support application influence on traffic routing and interaction with policy framework for policy control. The AF 512 may communicate with other functions within the SBA 500 via a Naf 512I interface.

Still referring to FIG. 5, the SBA 500 may include an authentication server function (AUSF) 514 that may serve as an authentication server. The AUSF 514 may communicate with other functions within the SBA 500 via a Nausf 514I interface. The SBA 500 may include the AMF 192 that may support the termination of non-access-stratum (NAS) signaling, NAS ciphering and integrity protection, registration management, connection management, mobility management, access authentication and authorization, security context management. The AMF 192 may communicate with other functions within the SBA 500 via a Namf 192I interface. The AMF 192 may also communicate with the UE 110 via the N1 interface and a RAN 106 with the N2 interface.

The RAN 106 may be a network entity residing between the core network 115 and the UE 110. The RAN 106 may be implemented, for example, by the base station 105. The RAN 106 may relay data between the core network 115 and the UE 110.

Still referring to FIG. 5, the SBA 500 may include the SMF 194 that may support session management (session establishment, modification, release), UE internet protocol (IP) address allocation & management, dynamic host configuration protocol functions, termination of NAS signaling related to session management, downlink data notification, traffic steering configuration for UPF for proper traffic routing. The SMF 194 may communicate with other functions within the SBA 500 via a Nsmf 194I interface. The SBA 500 may include the UPF 195 that may support packet routing & forwarding, packet inspection, quality of service (QoS) handling, act as the external PDU session interface to the data network (DN) 522, and is an anchor point for both intra radio access technology (RAT) and inter-RAT mobility. The UPF 195 may communicate with the SMF 194 via a N4 interface, the DN 522 via the N5 interface, and the RAN 106 via the N3 interface.

In some implementations, the RAN 106 and the UE 110 may communicate via the Uu (wireless radio or "air") interface.

Figure 6:
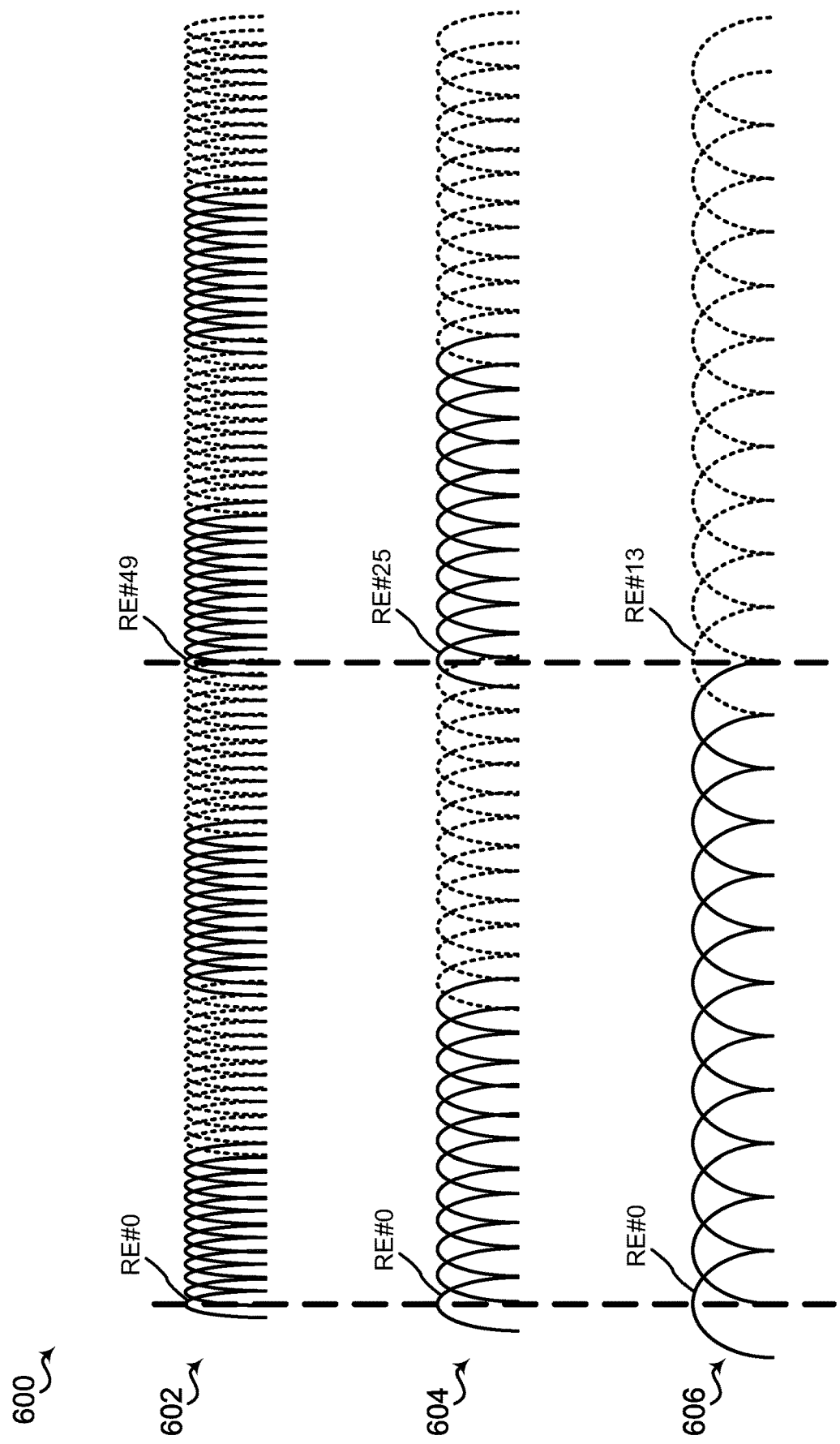
FIG. 6 is a timeline of different waveforms in an example resource block alignment for subcarrier waveforms having spacings of 15 kHz, 30 kHz, and 60 kHz.

Turning now to FIG. 6, which shows an example of an RB alignment diagram 600 for a 15 kHz subcarrier waveform 602, a 30 kHz subcarrier waveform 604, and a 60 kHz subcarrier waveform 606. In certain implementations, the 15 kHz subcarrier waveform 602 may have a SCS of 15 kHz. The 30 kHz subcarrier waveform 602 may have a SCS of 30 kHz. The 60 kHz subcarrier waveform 606 may have a SCS of 60 kHz. The 15 kHz subcarrier waveform 602, 30 kHz subcarrier waveform 604, and 60 kHz subcarrier waveform 606 may be part of one or more channel resource blocks or one or more synchronization signal blocks. In some examples, subcarrier spacing may be proportional to the reciprocal of a symbol duration and may be selected to avoid or mitigate blurring caused by Doppler shift and to maintain orthogonality between subcarriers. As a center frequency of different spectrum bands increases, having a larger subcarrier spacing may mitigate phase noise experienced when communicating at higher frequencies. Accordingly, in some examples, different base stations may support spectrum bands having different subcarrier spacings. While subcarrier spacing may be predetermined for a subframe (e.g., depending on the spectrum band or type of signal to be transmitted), subcarrier spacing may also vary throughout a subframe.

In some implementations, during the alignment of resources, the RE #0 of a higher numerology may be aligned with the RE #0 of a lower numerology. For example, RE #0 of the 15 kHz subcarrier waveform 602 may be aligned with RE #0 of the 30 kHz subcarrier waveform 604 and RE #0 the 60 kHz subcarrier waveform 606. In another example, RE #49 of the 15 kHz subcarrier waveform 602 may be aligned with RE #25 of the 30 kHz subcarrier waveform 604 and RE #13 of the 60 kHz subcarrier waveform 606. Other alignment schemes (not shown) may be possible.

Figure 7:
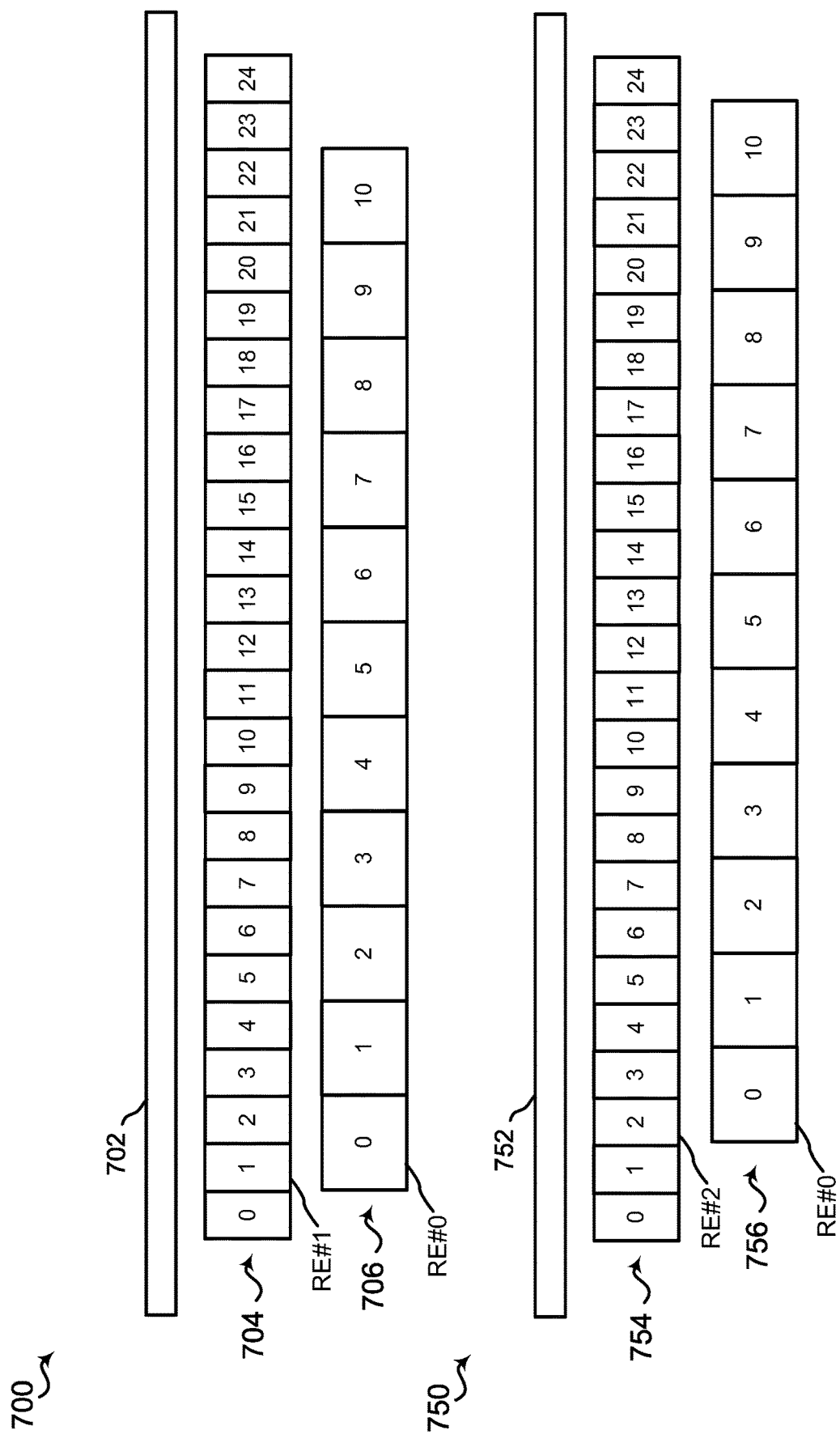
FIG. 7 is a block diagram of examples of RB alignment configurations.

Turning now to FIG. 7, examples of RB alignment configurations may include a first alignment configuration 700 and a second alignment configuration 750 having different numerologies. In some examples, the first alignment configuration 700 may include a first channel 702 having a first bandwidth, such as 1 MHz, 2 MHz, 3 MHz, 5 MHz, 10 MHz, 12, MHz, 15 MHz, 20 MHz, 50 MHz, 100 MHz, or other suitable bandwidths. The first alignment configuration 700 may include a first group of resource elements 704 having a SCS of 15 kHz and a second group of resource elements 706 having a SCS of 30 kHz. In the first alignment configuration 700, RE #1 of the first group of resource elements 704 may be aligned to RE #0 of the second group of resource elements 706. The first group of resource elements 704 may be channel resource elements or synchronization resource elements. The second group of resource elements 706 may be channel resource elements or synchronization resource elements. In alternative implementations, the first group of resource elements 704 may have a SCS of 30 kHz, 60 kHz, 120 kHz, 240 kHz, or other spacings. The second group of resource elements 706 may have a SCS of 60 kHz, 120 kHz, 240 kHz, or other spacings.

Still referring to FIG. 7, in some implementations, the second alignment configuration 750 may include a second channel 752 having a second bandwidth, such as 1 MHz, 2 MHz, 3 MHz, 5 MHz, 10 MHz, 12, MHz, 15 MHz, 20 MHz, 50 MHz, 100 MHz, or other suitable bandwidths. The second alignment configuration 750 may include a third group of resource elements 754 having a SCS of 15 kHz and a fourth group of resource elements 756 having a SCS of 30 kHz. In the second alignment configuration 750, RE #2 of the third group of resource elements 754 may be aligned to RE #0 of the fourth group of resource elements 756. The first group of resource elements 754 may be channel resource elements or synchronization resource elements. The second group of resource elements 756 may be channel resource elements or synchronization resource elements. In alternative implementations, the third group of resource elements 754 may have a SCS of 30 kHz, 60 kHz, 120 kHz, 240 kHz, or other spacings. The fourth group of resource elements 756 may have a SCS of 60 kHz, 120 kHz, 240 kHz, or other spacings.

Figure 8:
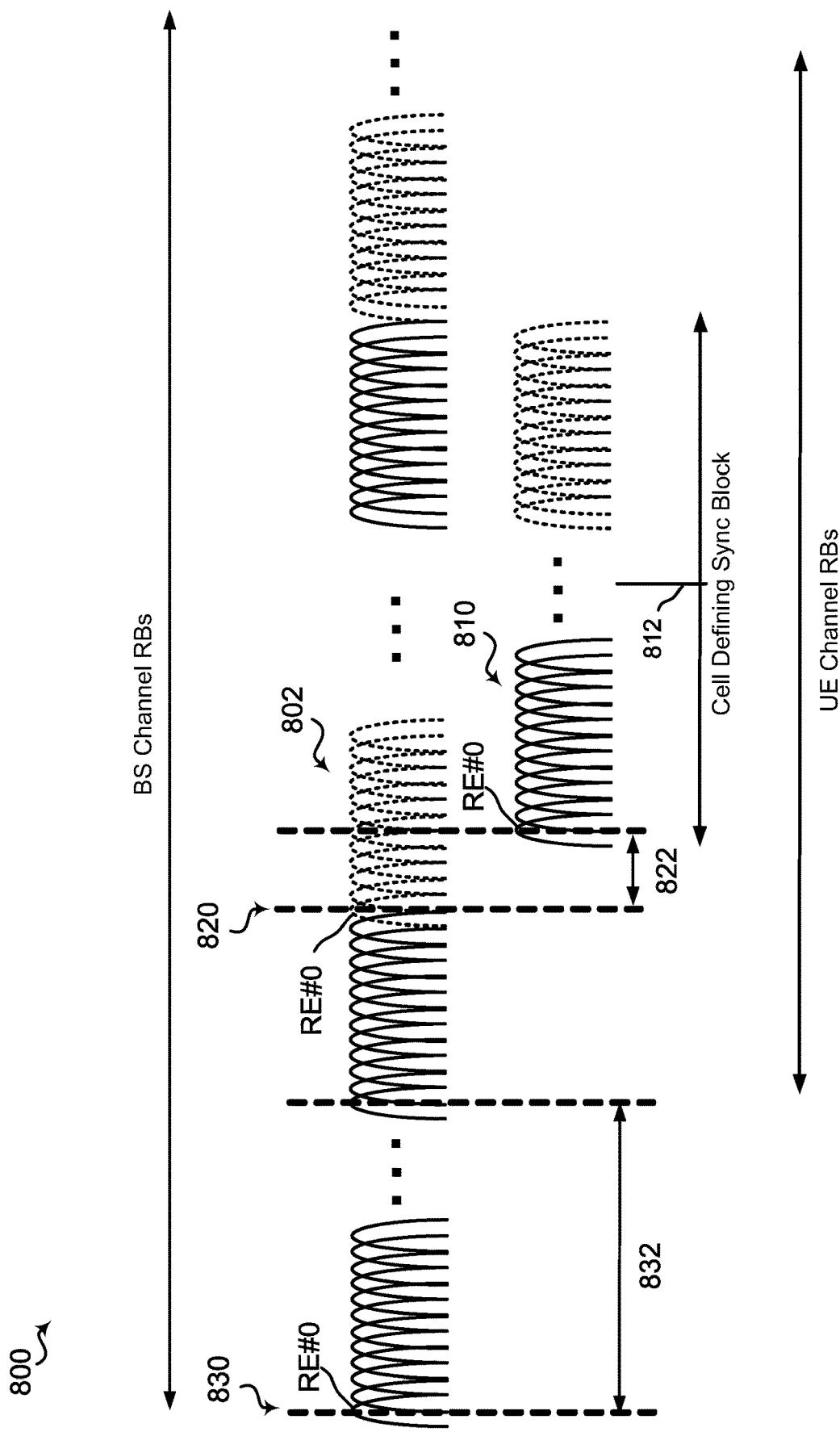
FIG. 8 is a resource block timeline of an example of a RB alignment reference signaling configuration.

Referring to FIG. 8, an example of a RB alignment reference signaling configuration 800 may include a channel RB 802 and a synchronization RB 810 of a cell defining synchronization block located at a SSref 812. In some implementations, the base station 105 may transmit a signal for alignment reference. The signal may be within the synchronization signal block where the numerologies are aligned to RE #0 of the channel resource block 802. For example, the RE #0 of the channel RB may be used as a reference 820. An offset 822 may optionally be placed to offset the synchronization RB 810 from the channel RB 802. Specifically, RE #0 of the synchronization RB 810 may be shifted from the RE #0 of the channel RB 802 by the offset 822. In other implementations, the channel RB 802 and the synchronization RB 810 may be aligned without any offset (i.e., the RE #0 of the channel RB 802 is aligned with the RE #0 of the synchronization RB 810). A reference 830 may indicate the RE #0 of the RB #0 of the base station channel RBs. The reference 830 may be referred to as Point A, in some examples. An OffsetToCarrier 832 may indicate an offset between the base station channel RBs and the UE channel RBs.

Still referring to FIG. 8, in certain implementations of determination of UE RB configuration and location with initial acquisition, the UE 110 acquires the synchronization RB 810 located at the SSref 812. Further, the UE 110 may receive the value of the offset 822 from the Master Information Block (MIB), for example, signaled as an offset or as a Raster offset, and/or the UE 110 may acquire RMSI location, such as via the Remaining Minimum System Information (RMSI) configuration. Examples of parameters signaled in the RMSI for each supported SCS may include absolute frequency value of the reference 830 (e.g., absoluteFrequencyPointA in FrequencyInfoDL, signaled as ARFCN NR), an offset in the physical resource block unit from the reference 830 to the first usable physical resource block (e.g., offsetToCarrier in SCS-SpecificCarrier), carrier bandwidth in the physical resource block unit (e.g., carrierBandwidth in SCS-SpecificCarrier), and sub-carrier spacing (e.g., subcarrierSpacing in SCS-SpecificCarrier) to determine the size of the physical resource block. The information obtained from the RMSI configuration may indicate, to the UE 110, the resource block structures (e.g., location of Point A), sub-carrier spacing, etc. By knowing the structures of the resource blocks allocated to the UE 110 and the offset value contained in the MIB, the UE 110 may properly locate the synchronization signal block, such as the synchronization RB 812.

Still referring to FIG. 8, in some implementations, the base station 105 may use an arbitrary channel RB edge or synchronization RB edge as the reference for alignment. In other examples, the base station 105 may use the default numerology as reference, or explicitly signal the reference. The base station 105 may use "0" to indicate that resource blocks with higher SCS may be aligned and "1" to indicate that resource blocks with higher SCS may be offset. Other indications may also be used.

In an alternative example, the base station 105 may use an arbitrary RB edge within the synchronization signal block or within the communication channel as a constant reference and signal the alignment. The base station 105 may use the default numerology as reference or explicitly signal the reference. Alternatively, the base station 105 may use 0 or 1 to signal if higher order numerology is aligned or offset compared to lower order on that RE.

Figure 9:
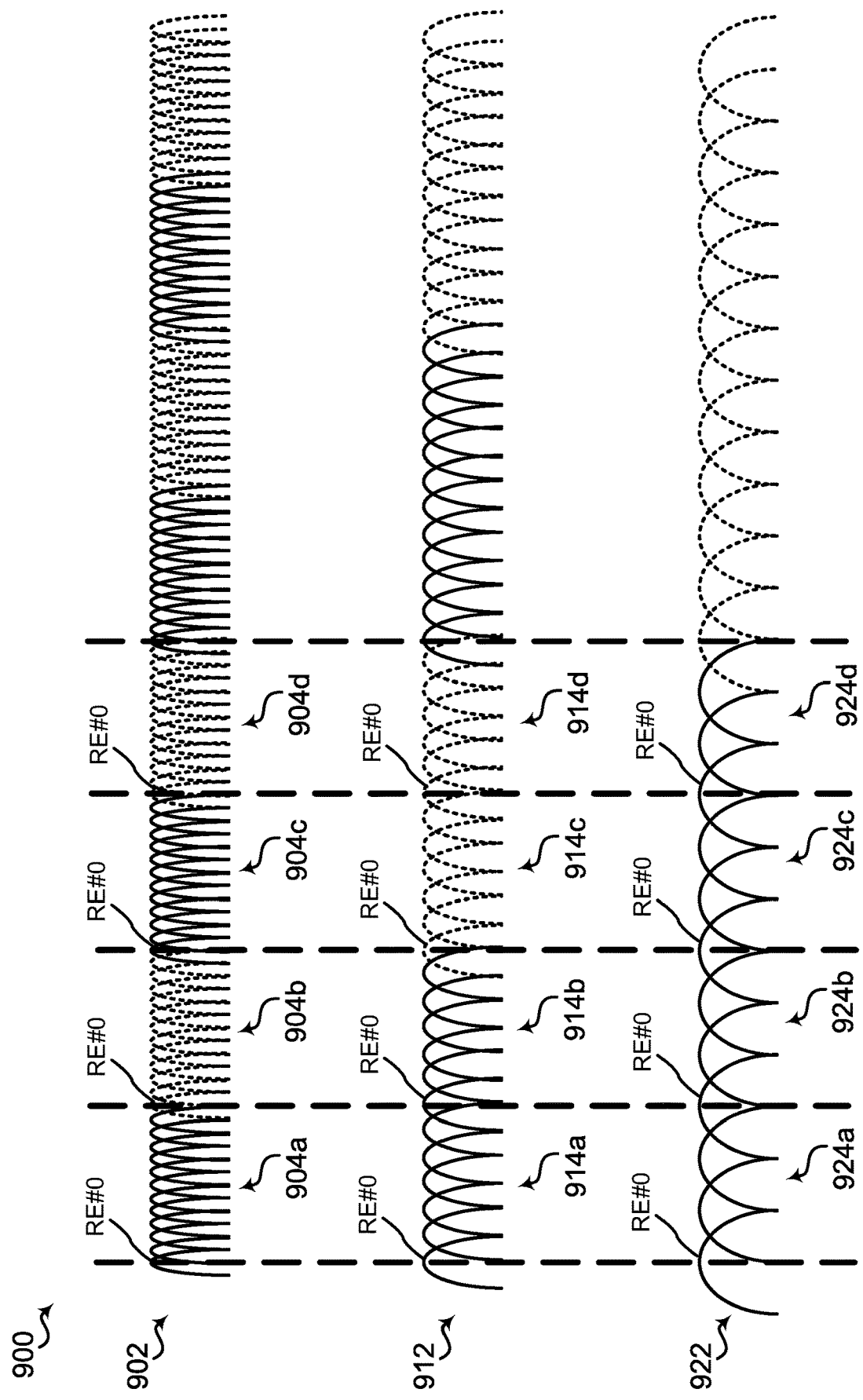
FIG. 9 is a timeline of different waveforms in an example of a RB alignment configuration.

Referring now to FIG. 9, an example of an RB alignment diagram 900 may include a 15 kHz subcarrier waveform 902, a 30 kHz subcarrier waveform 912, and a 60 kHz subcarrier waveform 922. In certain implementations, the base station 105 may define the reference signaling using pre-determined reference, such as the first or the last resource element of a resource block. In other examples, the pre-determined reference may be any resource element in a resource block. For example, RE #0 of a first RB 904a of the 15 kHz subcarrier waveform 902 may be aligned to RE #0 of a first RB 914a of the 30 kHz subcarrier waveform 912 and to RE #0 of a first RB 924a of the 60 kHz subcarrier waveform 922. In other examples, RE #0 of a second RB 904b may be aligned to RE #0 of a second RB 914b and RE #0 of a second RB 924b. RE #0 of a third RB 904c may be aligned to RE #0 of a third RB 914c and RE #0 of a third RB 924c. RE #0 of a fourth RB 904d may be aligned to RE #0 of a fourth RB 914d and RE #0 of a fourth RB 924d. Other alignment configurations are possible.

Figure 10:
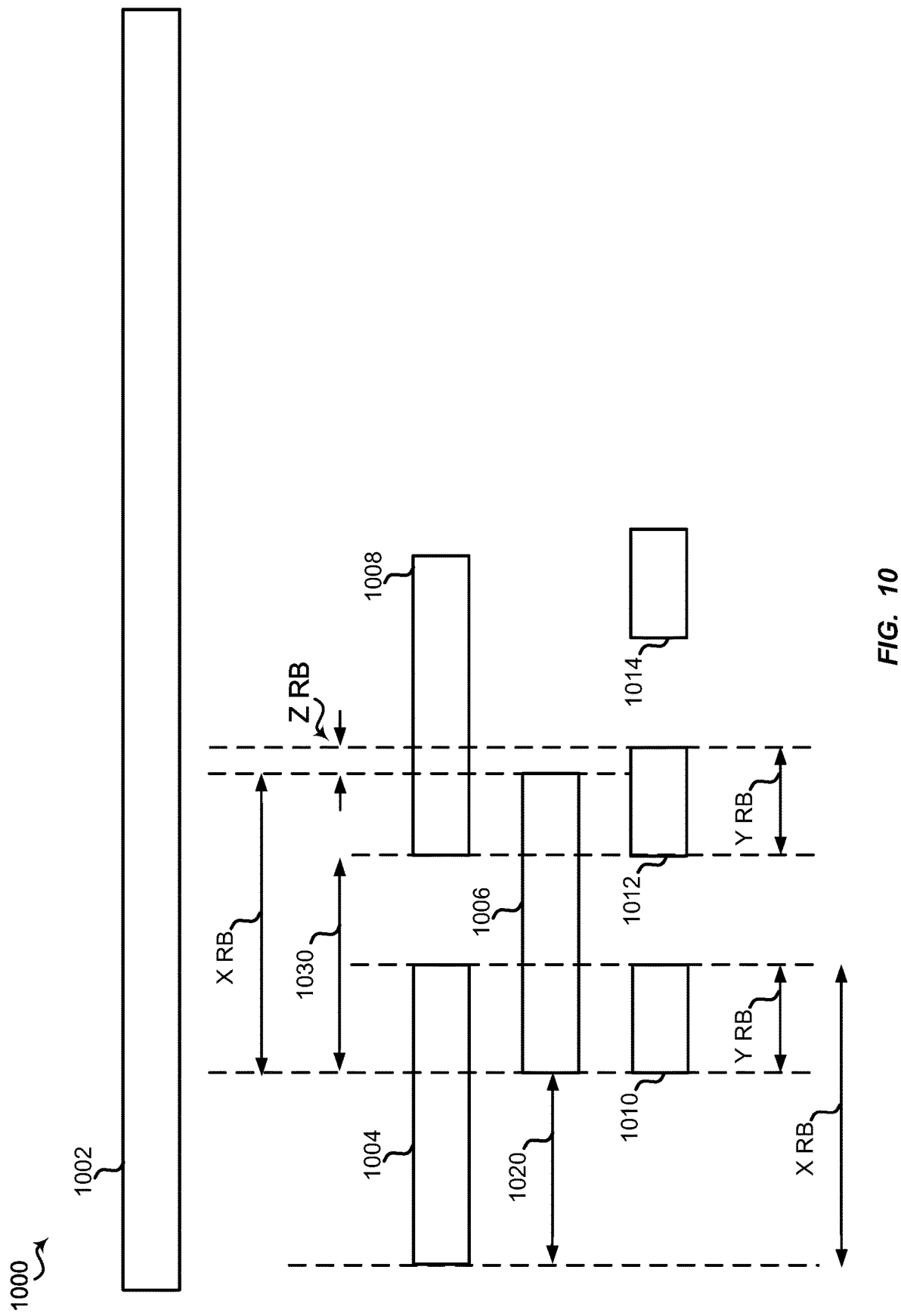
FIG. 10 is a synchronization raster down-selection SCS based raster.

Referring to FIG. 10, in certain implementations, a synchronization raster down-selection SCS based raster 1000 for allocating one or more synchronization channels/blocks may include a band 1002 (e.g., NR band). The SCS based raster 1000 may include a first minimum channel bandwidth 1004 (e.g., 1.4 MHz, 5 MHz, or 50 MHz), a second minimum channel bandwidth 1006, a third minimum channel bandwidth 1008, a first synchronization channel 1010, a second synchronization channel 1012, and a third synchronization channel 1014. The first minimum channel bandwidth 1004 may include X RBs and the second minimum channel width 1006 may also include X RBs, where X may be an integer greater than 0. In certain examples, the first minimum channel bandwidth 1004 and the second minimum channel width 1006 may include different numbers of RBs.

In some implementations, the first synchronization channel 1010, the second synchronization channel 1012, and the third synchronization channel 1014 may each include Y RBs, where Y may be an integer greater than 0. A subcarrier spacing may include Z RBs, where Z may be an integer greater than 0. The first synchronization channel 1010 may mark the beginning of the second minimum channel bandwidth 1006. The second synchronization channel 1012 may mark the beginning of the third minimum channel bandwidth 1008. A first offset 1020 between the first minimum channel bandwidth 1004 and the second minimum channel bandwidth 1006 may be X–Y RBs. A second offset 1030 between the second minimum channel bandwidth 1006 and the third minimum channel bandwidth 1008 may be X–Y+Z RBs. Alignment may be determined by the subcarrier spacing of Z RBs.

In some examples, Z may be 1 or greater. In certain implementations, the base station 105 may choose the positions in the band 1002 to place the synchronization channels 1010, 1012, 1014 and minimize the amount of entries. By reducing Z, the base station 105 may reduce the amount of bandwidth necessary to incorporate the synchronization channels.

Figure 11:
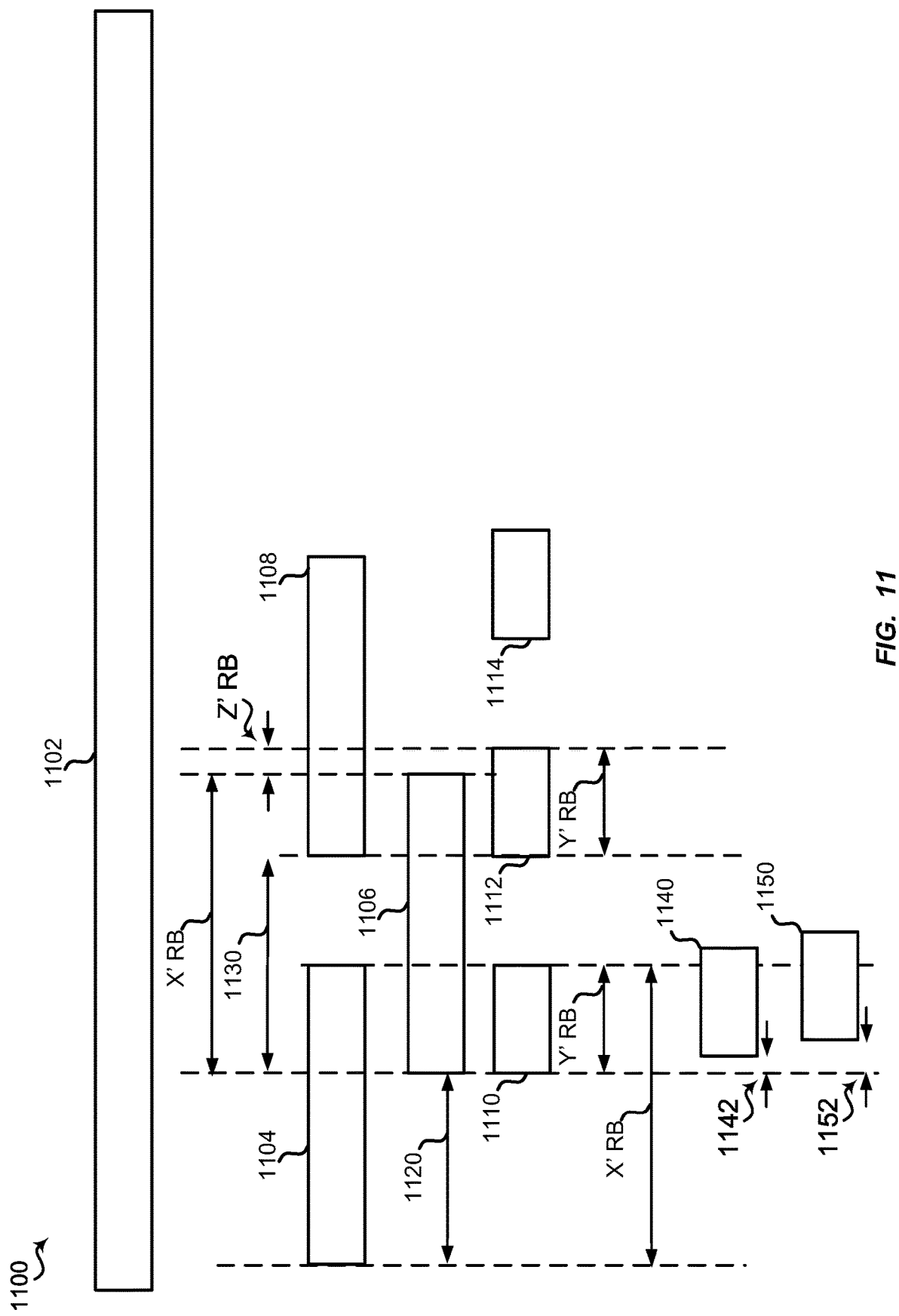
FIG. 11 is a synchronization raster down-selection 100 kHz based raster.

Turning now to FIG. 11, in certain implementations, a synchronization raster down-selection fixed-width-based raster 1100 for allocating one or more synchronization channels/blocks may include a band 1102 (e.g., NR band). The fixed-width-based raster 1100 may include a first minimum channel bandwidth 1104 (e.g., 1.4 MHz, 5 MHz, or 50 MHz), a second minimum channel bandwidth 1106, a third minimum channel bandwidth 1108, a first synchronization channel 1110, a second synchronization channel 1112, and a third synchronization channel 1114. The first minimum channel bandwidth 1104 may include X' RBs and the second minimum channel width 1106 may also include X' RBs, where X' may be an integer greater than 0. In certain examples, the first minimum channel bandwidth 1104 and the second minimum channel width 1106 may include different numbers of RBs.

In some implementations, the first synchronization channel 1110, the second synchronization channel 1112, and the third synchronization channel 1114 may each include Y' RBs, where Y' may be an integer greater than 0. A subcarrier spacing may include Z' RBs, where Z' may be an integer greater than 0. The first synchronization channel 1110 may mark the beginning of the second minimum channel bandwidth 1106. The second synchronization channel 1112 may mark the beginning of the third minimum channel bandwidth 1108. A first offset 1120 between the first minimum channel bandwidth 1104 and the second minimum channel bandwidth 1106 may be X'–Y' RBs. A second offset 1130 between the second minimum channel bandwidth 1106 and the third minimum channel bandwidth 1108 may be X'–Y'+Z' RBs.

In some implementations, the fixed-width-based raster 1100 may include a fourth synchronization channel 1140 and a fifth synchronization channel 1150. The fourth synchronization channel 1140 may be a first fixed offset 1142 from the first synchronization channel 1110. The first fixed offset 1142 may be, for example, 10 kHz, 20 kHz, 50 kHz, 100 kHz, 200 kHz, 500 kHz. Other values are possible. The fifth synchronization channel 1150 may be a second fixed offset 1152 from the first synchronization channel 1110. The second fixed offset 1152 may be integer multiple of the first fixed offset 1142. For example, if the first fixed offset 1142 is 100 kHz, the second fixed offset 1152 may be 200 kHz, 300 kHz, 400 kHz, or 500 kHz.

Figure 12:
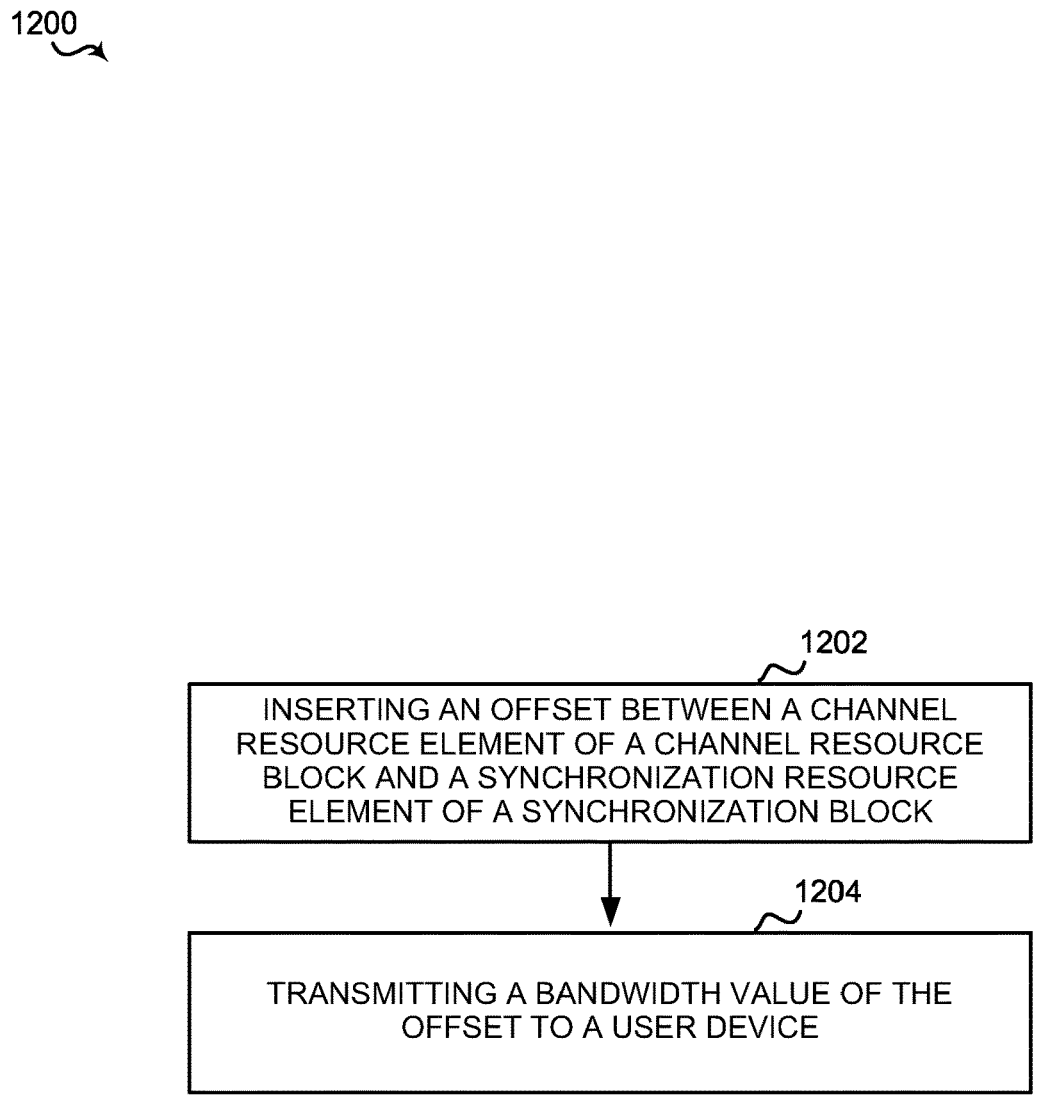
FIG. 12 is a process flow diagram of an example of a method for aligning resources.

Turning now to FIG. 12, a method 1200 of aligning resources may be performed by a base station 105.

At block 1202, the method 1200 may insert an offset between a channel resource element of a channel resource block and a synchronization resource element of a synchronization signal block. For example, the raster component 352 of the base station 105 may insert an offset (e.g., 15 kHz) between RE #0 of a channel resource block and RE #0 of a synchronization signal block.

At block 1204, the method 1200 may transmit a bandwidth value of the offset to a user equipment. For example, the communication component 350 of the base station 105 may transmit a value of 15 kHz to the UE 110.

Figure 13:
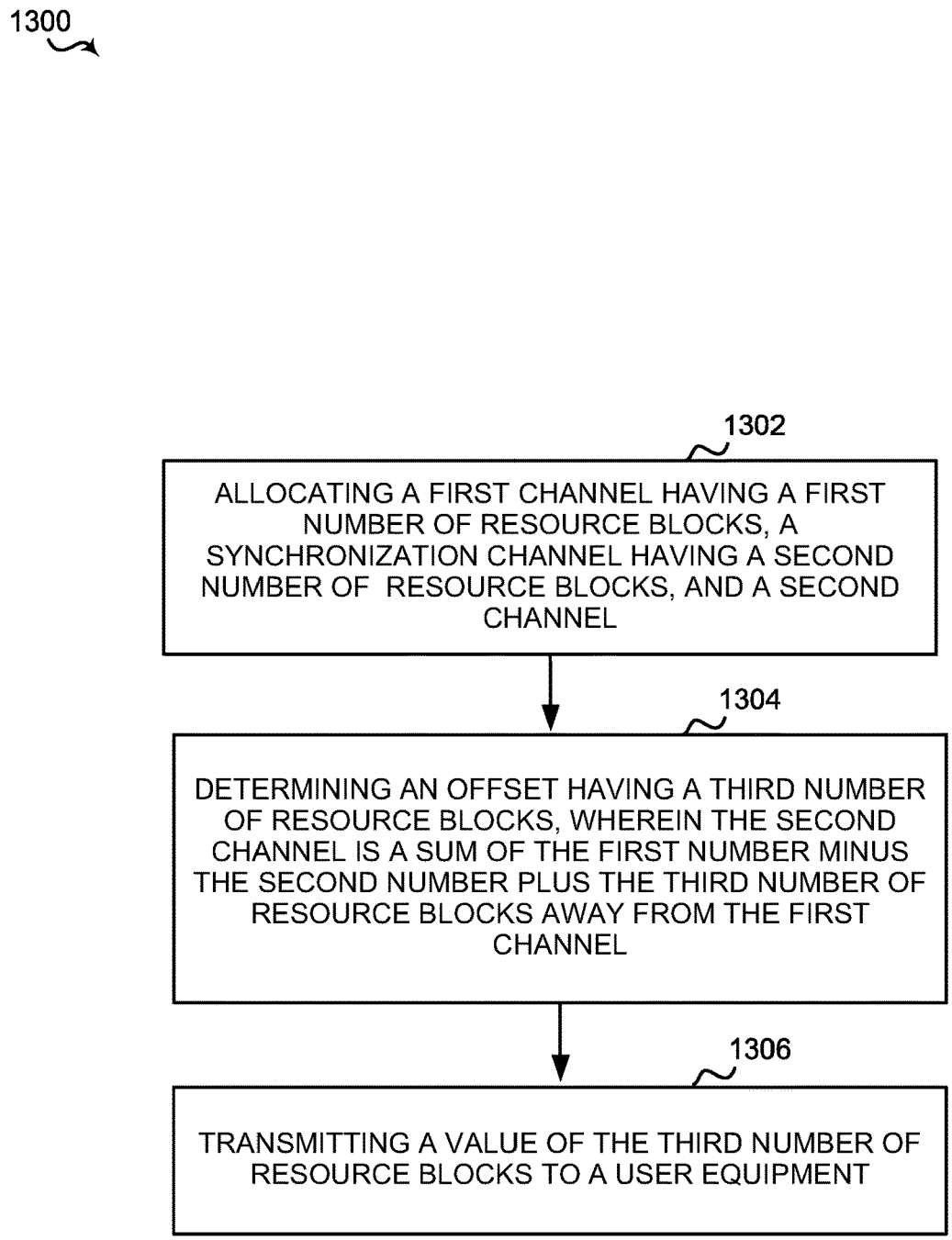
FIG. 13 is a process flow diagram of an example of another method for aligning resources.

Turning now to FIG. 13, a method 1300 of aligning resources may be performed by a base station 105.

At block 1302, the method 1300 may allocate a first channel having a first number (e.g., represented by X) of resource blocks, a synchronization channel having a second number (e.g., represented by Y) of resource blocks, and a second channel. For example, the raster component 352 of the base station 105 may allocate a first minimum channel having X resource blocks, a synchronization channel having Y resource blocks, and a second minimum channel. In this case, X and Y may be any whole number. The minimum channel may indicate the smallest bandwidth (i.e., X RBs) allocated by the base station 105 to the UE 110. The number Y may indicate the number of resource blocks in the synchronization channel. The values of X and Y may be determined by the base station 105 based on total available resources of the base station 105 and the resource requirements of the UEs 110.

At block 1304, the method 1300 may determine an offset having a third number (e.g., represented by Z) of resource blocks, wherein the second channel is a sum of the first number minus the second number plus the third number (e.g., X−Y+Z) of resource blocks away from the first channel. For example, the raster component 352 of the base station 105 may determine an offset having Z resource blocks (where Z is any whole number, e.g., 1), wherein the second channel is X−Y+Z resource blocks away from the first channel. In certain examples, such as those where more than one synchronization channels are present, the raster component 352 of the base station 105 may add an additional fixed offset to each synchronization channel, as discussed in FIG. 11, to distinguish the locations of one synchronization block over another. For example, a first synchronization channel may include an additional 100 kHz offset, a second synchronization channel may include an additional 200 kHz offset, and a third synchronization channel may include an additional 300 kHz offset, etc. In such examples, different UEs 110 may receive different offsets and locate their own synchronization signals without collision.

At block 1306, the method 1300 may transmit a value of Z to a user equipment. For example, the communication component 350 of the base station 105 may transmit a value of 1 to the UE 110. The value of Z may be the value of the fixed value offset by the base station 105 to distinguish one synchronization channel from another (e.g., one with a different Z value offset).

Figure 14:
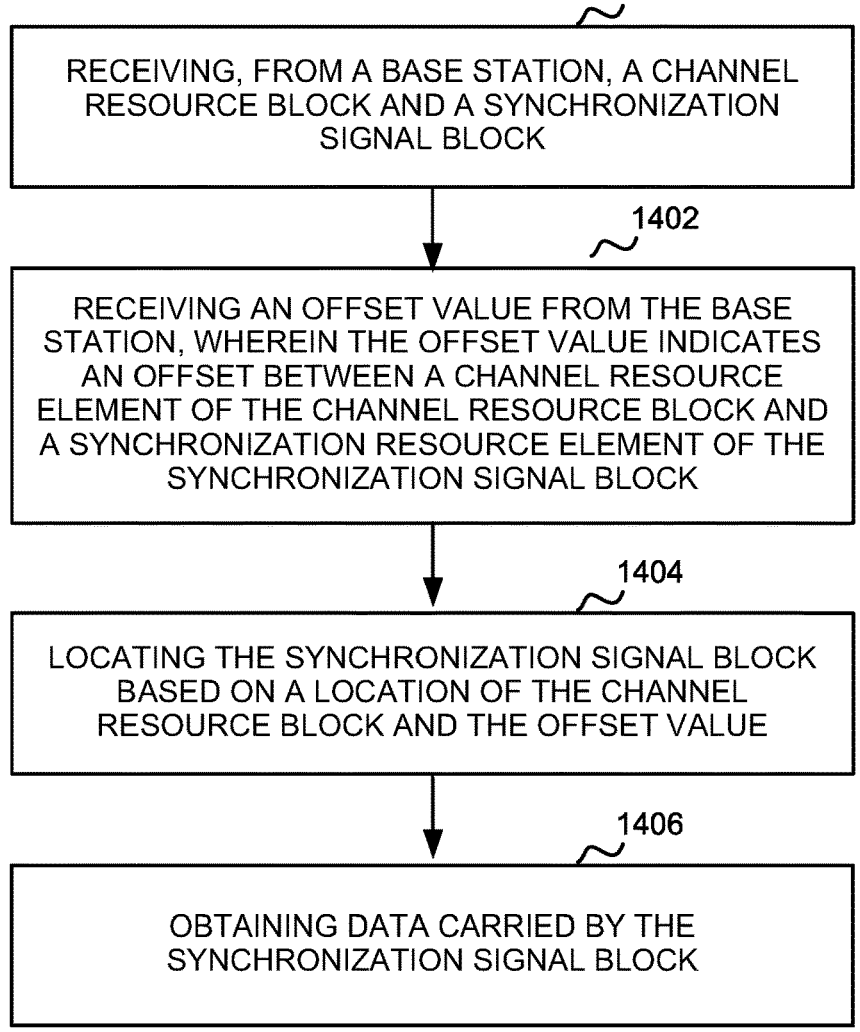
FIG. 14 is a process flow diagram of an example of a method for receiving an offset for locating the synchronization signal block.

Turning now to FIG. 14, a method 1400 of obtaining data from synchronization signal blocks may be performed by a user equipment 110. In particular, in an aspect, the communications component 250, modem 240, or one or more processors 212 of the UE 110 may execute computer readable instructions or code to perform the functions of the method 1400.

At block 1401, the method may receive a channel resource block and a synchronization signal block. For example, the communication component 250 of the UE 110 may receive a channel resource block (e.g., the channel RB 802) and a synchronization signal block (e.g., the synchronization RB 810) from the base station 105 to initiate the synchronization process. For instance, the UE 110 receives a wireless signal, including the channel RB 802 and the synchronization RB 810, from the BS 105 via one or more antennas 265, and the signal is processed by the UE 110 via the RF front end 288, the receiver 206 in the transceiver 202, and by the processor 212 and/or modem 240 to decode the signal and extract the channel RB 802 and the synchronization RB 810 from the wireless signal. The synchronization block may include information relating to primary and secondary synchronization signals, physical broadcast channel information, demodulation reference signal information, and other information used by the UE 110 to establish a session with the base station 105.

At block 1402, the method 1400 may receive an offset value from a base station, wherein the offset value indicates an offset between a channel resource element of a channel resource block and a synchronization resource element of a synchronization signal block. For example, the communication component 250 of the UE 110 may receive an offset value from the base station 105 that indicates the location of the synchronization signal block, as described above with respect to FIG. 8. For instance, the UE 110 receives a wireless signal, such as a MIB, from the BS 105 via one or more antennas 265, and the signal is processed by the UE 110 via the RF front end 288, the receiver 206 in the transceiver 202, and by the processor 212 and/or modem 240 to decode the MIB and extract the offset value from the wireless signal.

At block 1404, the method 1400 may locate the synchronization signal block based on a location of the channel resource block and the offset value. For example, the resource component 252 of the user equipment 110 may locate the synchronization signal block based on a location of the channel resource block and the offset value, as described above with respect to FIG. 8. In a non-limiting example, the UE 110 executing the resource component 252 may locate the synchronization signal block by determining a location of the channel resource block, identifying the value of the offset value, where the value indicates a number of resource elements, and counting the number of resource element corresponding to the offset value from the channel resource block to locate the synchronization signal block. For example, the UE 110 executing the resource component 252 may determine the location of the channel resource block based on the information in the MIB and/or RMSI transmitted by the base station 105 (e.g., physical broadcasting channel, physical downlink control channel, physical downlink shared channel, etc.). The information in the MIB and/or RMSI (also known as the system information block) may indicate the Point A (i.e., the starting location of the channel resource block), the subcarrier spacing, the total channel width, etc. The UE 110 may use the information in the MIB to identify the location of the channel resources available to the UE 110. Based on the location of the channel resources and the offset (e.g., ssb-subcarrierOffset) received via the MIB or the RMSI, the UE 110 may be able to compute and locate the location of the synchronization block within the allocated resources.

At block 1406, the method 1400 may obtain data carried by the synchronization signal block. For example, the resource component 252 of the UE 110 may obtain the data stored in the synchronization signal block. For instance, in an example, the receiver 206 of the UE 110 acquires the wireless signal carrying the SS block via the one or more antennas 265 and the RF front end, and decodes the wireless signal and passes the data carried by the SS block to the at least one processor 212 and/or modem 240, and thus to the resource component 252.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for wireless communications by a user equipment, comprising:
   receiving, from a base station, a channel resource block and a synchronization signal block with partially overlapping bandwidths;
   receiving, from the base station, a value of a bandwidth offset that is equal to a quantity of resource elements between an initial channel resource element of the channel resource block and an initial synchronization resource element of the synchronization signal block;
   locating the synchronization signal block based on a location of the channel resource block and the bandwidth offset; and
   obtaining data carried by the synchronization signal block.

2. The method of claim 1, wherein a first subcarrier spacing of the channel resource block has a bandwidth of 15 kilohertz (kHz) and a second subcarrier spacing of the synchronization signal block has a bandwidth of 15 kHz, 30 kHz, 60 kHz, 120 kHz, or 240 kHz.

3. The method of claim 1, wherein a first subcarrier spacing of the synchronization signal block has a bandwidth of 15 kHz and a second subcarrier spacing of the channel resource block has a bandwidth of 15 kHz, 30 kHz, 60 kHz, 120 kHz, or 240 kHz.

4. The method of claim 1, wherein the bandwidth offset is an integer multiple of a bandwidth of the initial channel resource element or the initial synchronization resource element.

5. The method of claim 1, wherein the synchronization signal block is a cell defining synchronization signal block.

6. A user equipment (UE), comprising:
   a transceiver;
   a memory; and
   one or more processors in communication with the transceiver and the memory, the one or more processors being configured to:
      receive, from a base station, a channel resource block and a synchronization signal block with partially overlapping bandwidths;
      receive, from the base station, a value of a bandwidth offset that is equal to a quantity of resource elements between an initial channel resource element of the channel resource block and an initial synchronization resource element of the synchronization signal block;
      locate the synchronization signal block based on a location of the channel resource block and the bandwidth offset; and
      obtain data carried by the synchronization signal block.

7. The UE of claim 6, wherein a first subcarrier spacing of the channel resource block has a bandwidth of 15 kilohertz (kHz) and a second subcarrier spacing of the synchronization signal block has a bandwidth of 15 kHz, 30 kHz, 60 kHz, 120 kHz, or 240 kHz.

8. The UE of claim 6, wherein a first subcarrier spacing of the synchronization signal block has a bandwidth of 15 kHz and a second subcarrier spacing of the channel resource block has a bandwidth of 15 kHz, 30 kHz, 60 kHz, 120 kHz, or 240 kHz.

9. The UE of claim 6, wherein the bandwidth offset is an integer multiple of a bandwidth of the initial channel resource element or the initial synchronization resource element.

10. A non-transitory computer readable medium storing instructions that, when executed by one or more processors of a user equipment, cause the one or more processors to:
    receiving, from a base station, a channel resource block and a synchronization signal block with partially overlapping bandwidths;
    receive, from a base station, a value of a bandwidth offset that is equal to a quantity of resource elements between an initial channel resource element of the channel resource block and an initial synchronization resource element of the synchronization signal block;
    locate the synchronization signal block based on a location of the channel resource block and the bandwidth offset; and
    obtain data carried by the synchronization signal block.

11. The non-transitory computer readable medium of claim 10, wherein a first subcarrier spacing of the channel resource block has a bandwidth of 15 kilohertz (kHz) and a second subcarrier spacing of the synchronization signal block has a bandwidth of 15 kHz, 30 kHz, 60 kHz, 120 kHz, or 240 kHz.

12. The non-transitory computer readable medium of claim 10, wherein a first subcarrier spacing of the synchronization signal block has a bandwidth of 15 kHz and a second subcarrier spacing of the channel resource block has a bandwidth of 15 kHz, 30 kHz, 60 kHz, 120 kHz, or 240 kHz.

13. The non-transitory computer readable medium of claim 10, wherein the bandwidth offset is an integer multiple of a bandwidth of the initial channel resource element or the initial synchronization resource element.

* * * * *